United States Patent [19]
Chang

[11] Patent Number: 5,848,400
[45] Date of Patent: Dec. 8, 1998

[54] ELECTRONIC CHECK EXCHANGE, CLEARING AND SETTLEMENT SYSTEM

[75] Inventor: Sheueling S. Chang, Cupertino, Calif.

[73] Assignee: Sun Microsystems, Inc., Palo Alto, Calif.

[21] Appl. No.: 673,918

[22] Filed: Jul. 1, 1996

[51] Int. Cl.$^6$ .............................. G06F 15/20; G06G 7/52
[52] U.S. Cl. ................................ 705/35; 705/35; 705/26; 705/27; 705/40; 235/379; 380/23; 380/24
[58] Field of Search .................................. 705/35, 26, 27, 705/40; 235/379; 380/23, 24

[56] References Cited

U.S. PATENT DOCUMENTS

| | | | |
|---|---|---|---|
| 5,455,407 | 10/1995 | Rosen | 380/24 |
| 5,644,727 | 7/1997 | Atkins | 705/40 |
| 5,671,279 | 9/1997 | Elgamal | 380/23 |
| 5,691,524 | 11/1997 | Josepson | 235/379 |
| 5,692,132 | 11/1997 | Hogan | 705/27 |
| 5,710,887 | 1/1998 | Chelliah et al. | 705/26 |

*Primary Examiner*—Allen R. MacDonald
*Assistant Examiner*—Jagdish Patel
*Attorney, Agent, or Firm*—Gary S. Williams; Flehr Hohbach Test Albritton & Herbert LLP

[57] ABSTRACT

An electronic financial transaction clearing and settlement system handles and processes electronic financial transactions on behalf of a set of regional banks and correspondent banks. In particular, each bank participating in the system has a financial transaction server. The financial transaction server of each regional bank performs settlement and transaction forwarding services on behalf of the correspondent banks serviced by that regional bank. The financial transaction server for each correspondent bank transmits and receives electronic financial transactions to and from the financial transaction server for its regional bank. The financial transaction server for a regional bank includes a first interface for receiving electronic financial transactions from clients, a second interface for transferring electronic financial transactions to and from the electronic financial transaction servers of other regional banks, and a third interface to transferring electronic financial transactions to the regional bank associated with the electronic financial transaction server. Each electronic financial transaction has associated therewith a payor, a payor's financial institution, a payee and a payee's financial institution. The financial transaction server for a regional bank also includes transaction logic for determining, for each financial transaction received from a client, whether the received financial transaction satisfies predefined integrity criteria, and settlement logic for processing each received financial transaction by updating at least one account balance associated with at least one of the payor or payee's financial institution, and forwarding the received financial transaction to at least one of the payor or payee's financial institution via the second or third interface.

11 Claims, 4 Drawing Sheets

Prior Art

ELECTRONIC CHECK EXCHANGE, CLEARING AND SETTLEMENT SYSTEM

This invention relates to electronic communication systems and in particular to a method and apparatus for clearing and settling electronic financial transactions between financial institutions connected by a network.

BACKGROUND OF THE INVENTION

There is a great demand to support on-line business transactions, same day payment transactions and payment exchanges in a fully automated closed-loop information and payment exchange system. Today, over 60 billion paper checks are written a year, the majority written by businesses and this number continues to grow.

Figure 1:
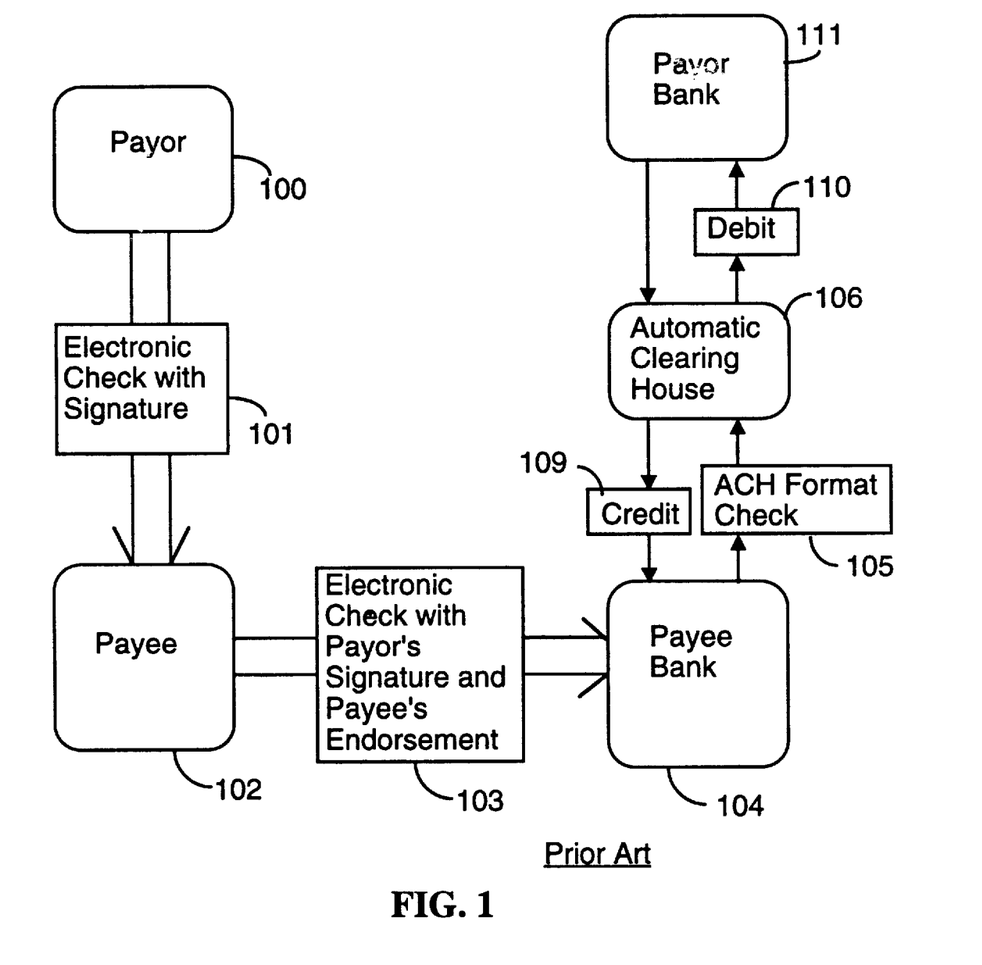
FIG. 1 shows a prior art electronic check settlement system.

The transfer of funds electronically between bank institutions is known in the art. Specifically, a prior art system for transferring funds in an electronic check is shown in FIG. 1. An electronic check is an electronic payment instruction digitally signed and/or endorsed by the payor (or payee) using public key cryptographic technology. A payor 100 issues an electronic check 101 with a digital signature to the payee 102. The payee endorses the check by providing a digital signature to the check which then passes the endorsed check 103 electronically to the payee's bank 104. The payee's bank verifies the syntax of the check to make sure it is correct, and verifies the two signatures on the check, both the signature of the payor and the endorsement signature of the payee. Thereafter the payee bank converts the check into a format suitable for clearing with the Automatic Clearing House (ACH) 106. The payee bank issues a formatted ACH debit instruction 105 containing the check to the Automatic Clearing House 106. The Automatic Clearing House is part of the Federal Reserve Net Settlement System. Finally, at the designated time of day, the Automatic Clearing House performs the check settlements and eventually performs a funds transfer by sending a credit 109 to the payee's bank 104 and a debit 110 to the payee institution 111.

The banking industry has long acknowledged that the national Federal Reserve check clearing and settlement system has numerous drawbacks. One of the problems relates to the amount of time it takes to clear a transaction. Typically in the national system, funds are not settled for 2–3 days from the day the check is received by the institution. In order to assure the integrity and availability of funds, most institutions place holds on the availability of the funds until after checks clear. This causes inconveniences to both banks and end users. What is needed is a settlement system for more quickly settling transactions between institutions who regularly conduct business, but which also allows other check settlements and fund transfers to be performed between institutions that may be remotely located from each other and that conduct business less frequently.

SUMMARY OF THE INVENTION

An electronic financial transaction clearing and settlement system handles and processes electronic financial transactions on behalf of a set of large regional banks and smaller correspondent banks. In particular, each bank participating in the system has a financial transaction server. The financial transaction server of each regional bank performs settlement and transaction forwarding services on behalf of the correspondent banks serviced by that regional bank. The financial transaction server for each correspondent bank transmits and receives electronic financial transactions to and from the financial transaction server for its regional bank.

The financial transaction server for a regional bank includes a first interface for receiving electronic financial transactions from clients, a second interface for transferring electronic financial transactions to and from the electronic financial transaction servers of other regional banks, a third interface for transferring electronic financial transactions to and from the regional bank associated with the electronic financial transaction server, and a fourth interface to transfer "end of day" electronic settlement instructions to a settlement institution. The second interface is also used for transferring electronic financial transactions to and from correspondent banks serviced by the regional bank's electronic financial transaction server.

Each electronic financial transaction has associated therewith a payor, a payor's financial institution, a payee and a payee's financial institution. The financial transaction server for a regional bank also includes transaction logic for determining, for each financial transaction received from a client, whether the received financial transaction satisfies predefined integrity criteria, and settlement logic for processing each received financial transaction by updating at least one correspondent account balance associated with at least one of the payor or payee's financial institution, and forwarding the received financial transaction to at least one of the payor or payee's financial institution via the second or third interface.

The financial transaction server for correspondent banks is similar to that of the regional banks, except that this server does not need to forward transactions from one server to another, and also it does not need to maintain correspondent accounts. This server transfers electronic financial transactions to and from one predefined regional bank.

BRIEF DESCRIPTION OF THE DRAWINGS

Additional objects and features of the invention will be more readily apparent from the following Detailed Description and appended claims when taken in conjunction with the drawings in which:

DESCRIPTION OF THE PREFERRED EMBODIMENTS

Figure 2:
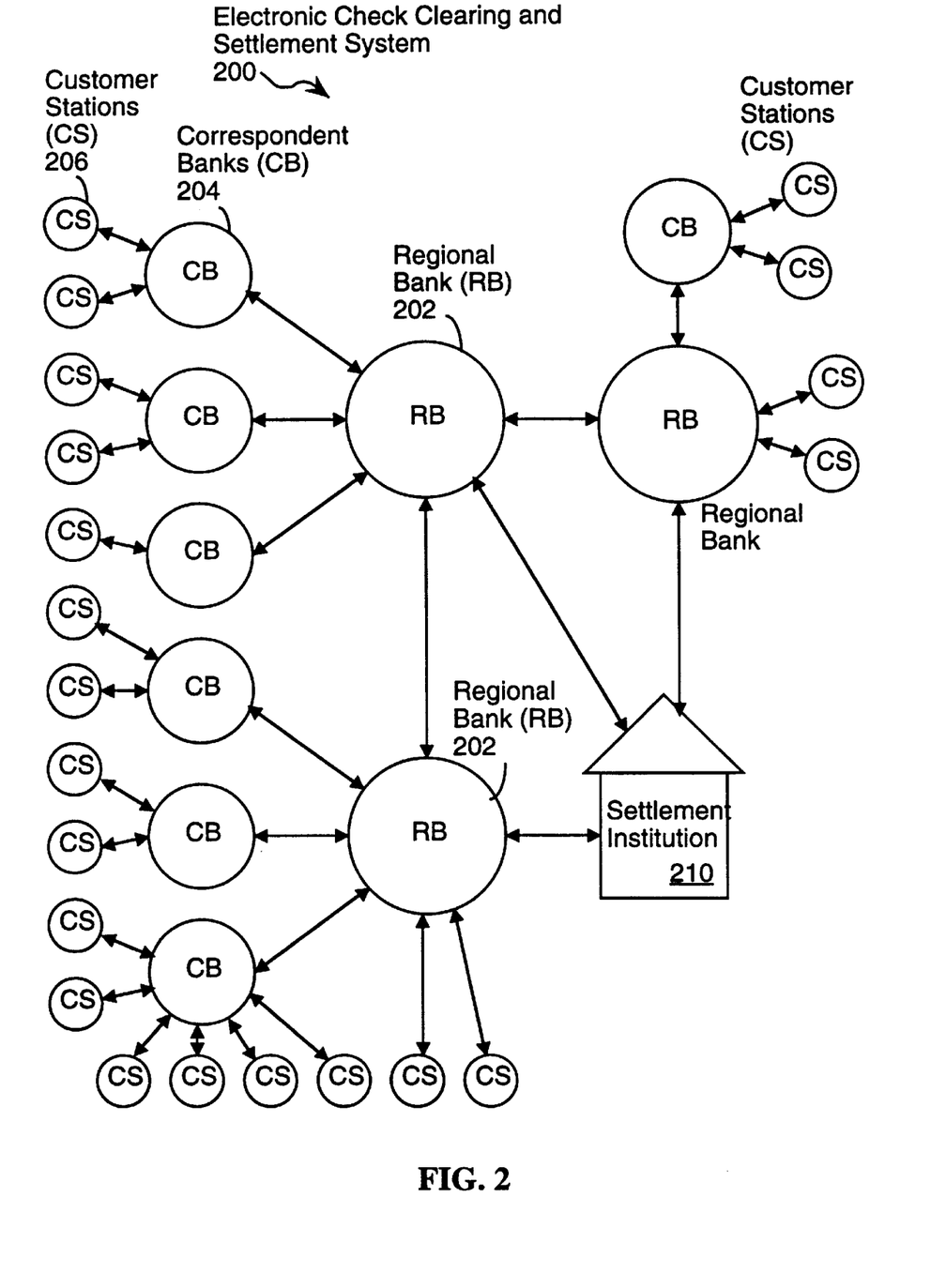
FIG. 2 shows a financial transaction settlement system according to the preferred embodiment of the present invention.

Referring now to FIG. 2, the present invention is an electronic check exchange clearing and settlement system 200 that interconnects the financial transaction servers 202, 204 of many banks for the purpose of handling electronic financial transactions. For the purposes of this document, financial institutions will be called "banks." Further, except where explicitly noted, no distinction will be made between a bank and its corresponding financial transaction server 202, 204.

Regional banks 202 are financial institutions, typically larger banks, that have agreed to perform electronic check and credit clearance and settlement services on behalf of a set of correspondent banks. That is, each regional bank's financial transaction server 202 is electronically connected to the financial transaction servers 204 of a set of correspondent banks for which it performs check and credit clearing and settlement services. Each regional bank's financial transaction server 202 is also electronically connected to the financial transaction servers of the other regional banks. It is envisioned that a set of approximately fifty to one-hundred regional bank financial transaction servers will be sufficient to service the electronic financial transaction needs of all banks in the continental United States, but the present invention is equally applicable to systems having many fewer or many more regional banks.

The correspondent and regional banks are interconnected by various communication links. Similarly, the regional banks are interconnected with each other by various communication links. Furthermore, customers of the banks can submit transactions in the form of electronic checks, credits and bill transactions to their respective banks using customer stations 206. The customer stations are typically desktop computers programmed with appropriate software to interact with the respective bank's computers, over various communication links, but may also include turnkey computer stations used solely for handling financial transactions. The communication links used for the communications between the customer stations 206, correspondent banks 204 and regional banks 202 include dedicated telephone links, private and public wide area networks, and the Internet.

All financial transaction messages are transmitted in encrypted form using either well known or proprietary encryption techniques, thereby protecting the confidentiality and integrity of the financial transaction messages. The present invention may use any suitable method of message encryption.

The regional banks 202 are also linked to a national clearinghouse organization (herein called a settlement institution) 210, one example of which is the Automated Clearing House (ACH). In a preferred embodiment, after all financial transactions for the day have been settled and cleared, each regional bank will determine the net amount of funds it owes to the other regional banks and will effect a transfer of the final computed amount of funds to each such other regional bank using the settlement services of the settlement institution 210.

Regional Bank Financial Transaction Server

Figure 3:
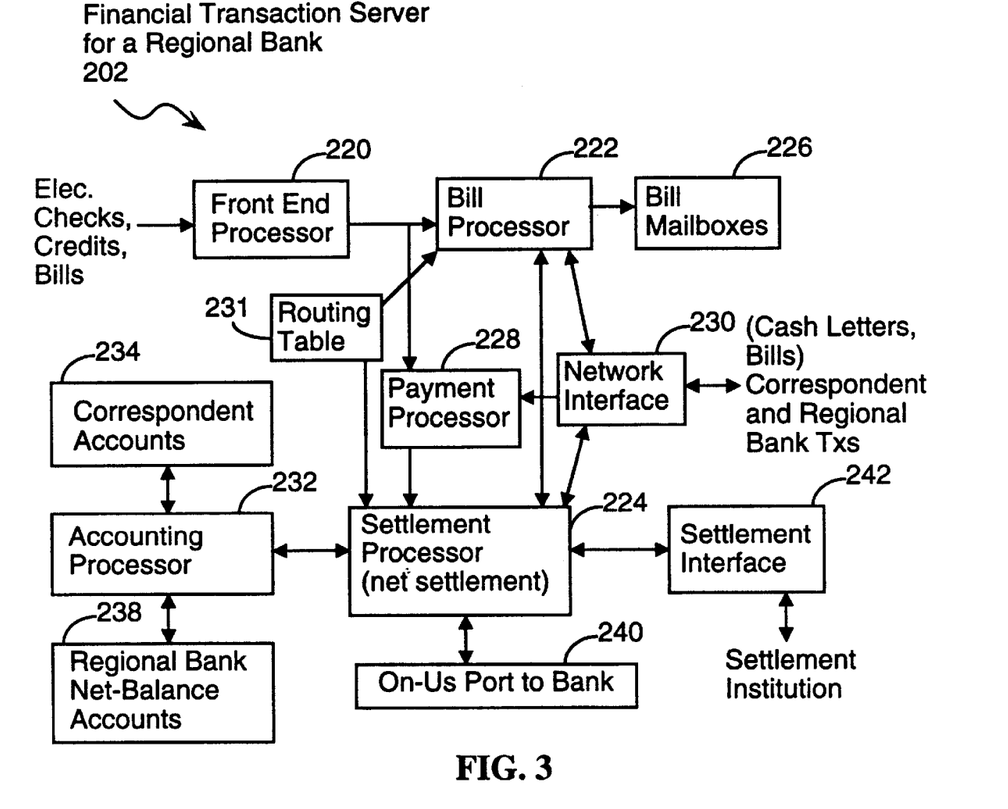
FIG. 3 is a block diagram of the functional modules in a financial transaction server for a regional bank, providing financial transaction services to correspondent banks in accordance with an embodiment of the present invention.

Referring to FIG. 3, there is shown the logical architecture of a financial transaction server associated with a regional bank 202. A front end processor 220 is used to receive financial transaction requests from customer stations. The front end processor 220 performs an initial pre-processing of received transaction requests, in particular to ensure that the transaction requests comply with electronic financial transaction formatting requirements and to determine whether each transaction is a bill transaction or an electronic check or credit.

After the financial transaction has been pre-processed in the front end processor 220, it is transferred to the either the bill processor 222, if the transaction is a bill, or to the payment processor 228, if the transaction is an electronic check or credit. In the preferred embodiment the front end processor 220, bill processor 222, payment processor 228 and settlement processor 224 are software procedures executed by a common processor or set of processors in a single or multi-processor computer system.

All received financial transaction requests are verified by the payment processor 228 to determine whether they meet predefined integrity criteria and transaction requests not meeting those criteria are rejected. The integrity criteria are the same as or similar to conventional integrity criteria for electronic financial transactions, including digital signature verification and other consistency checks, and are not the subject of this document. Financial transaction requests that are authenticated by the payment processor 228 are sent to the settlement processor 224 for clearing and settlement processing.

Each electronic check and credit transaction has associated therewith a payor, a payor's financial institution, a payee, a payee's financial institution, and a dollar amount (or other financial quantity when financial units other than dollars are used). At the point of initial submission into the financial transaction settlement network 200, each electronic check and credit transaction also has authentication data required to authenticate the transaction.

It is noted here that, in the preferred embodiment, electronic check (i.e., debit) and credit financial transactions where the designated financial institutions for both the payor and payee are the same are handled by the financial institution directly, without involvement of the financial transaction settlement server 202. However, in alternate embodiments the financial transaction settlement server 202 could be used to process such "single institution" debits and credit transactions.

In one embodiment, the payment processor 228 receives a payment instrument known as an electronic check developed by the FSTC (Financial Services Technology Consortium), which uses public key cryptographic techniques and tamper-proof chip cards to provide consumers and businesses of all sizes secure electronic payment mechanisms over the Internet. The payment processor 228 performs verification of the syntax of the financial transactions as well as verification of the electronic signatures associated with the financial transactions.

The bill processor 222, in one embodiment, utilizes a bill mailbox 226 that is created for each client (i.e., account holder) at a given financial institution. Bills can be posted to the bill mailboxes 226 by various bill issuers who are connected to the financial transaction server 202 via their customer stations. Specifically, a bill issuer will issue an electronic bill to a respective specified client (called a payor) and the bill processors in the servers for the financial institutions associated with the bill issuer and client work together to place the bill in the bill mailbox associated with the specified client. More specifically, when the bill processor 222 receives an electronic bill from a bill issuer via the front end processor 220, the bill processor 222 posts it to the appropriate client bill mailbox 226 if the payor financial institution specified in the electronic bill is this financial institution. Otherwise the bill processor 222 transfers the electronic bill to the financial transaction server of the specified payor financial institution via the network interface 230.

Electronic bills are transferred between regional banks and/or correspondent banks in a manner similar to credit/debit electronic payment instructions. Preferably, the bill processor 222 collects all electronic bills requiring transfer to other banks for a predetermined period of time, such as a day. At the end of the predetermined time period, the bill processor transmits a "bill envelope" to each other bank whose clients or whose correspondent bank clients are the specified recipient of at least one of the received electronic bills. Each bill envelope is an encrypted electronic message that holds a set of electronic bills. When a bill envelope is sent to a correspondent bank of the regional bank that is transmitting the bill envelope, all the electronic bills in that bill envelope will specify payors who are clients (or who are believed by the bill issuer to be clients) of the correspondent bank. When a bill envelope is sent to another regional bank, the electronic bills in that bill envelope will have specified payors who are clients of that regional bank and/or that regional bank's correspondent banks.

The bill processor 222 uses a routing table 231 to determine the destination financial transaction server to which each electronic bill should be sent. The routing table 231 maps financial institution identifications into financial transaction server network identifiers suitable for controlling the routing of bill envelopes and cash letters (cash letters will be discussed below). The bill processor 222 repackages the electronic bills based on each destination bank and routes the bills to other receiving regional banks through network interface 230.

The bill processor 222 also receives electronic bills via other regional banks via the network interface 230, in the form of the aforementioned bill envelopes. The bill processor 222 determines which of the electronic bills in the received bill envelopes are for clients having bill mailboxes 226 at this bank, and posts those bills to the appropriate mailboxes. Electronic bills in the received bill envelope that are for clients of the receiving regional bank's correspondent banks are repackaged by the bill processor 222 into separate bill envelopes for the various correspondent banks and those bill envelopes are then transmitted to the correspondent banks via the network interface 230.

In one embodiment, the bill transaction is not deemed a financial transaction and no financial settling or transfer of funds is required until authorized and initiated by a client. Alternatively, a financial transaction server 202 can be set up in such a way that the placement of a bill in the bill mailbox may result in an automatic transfer of funds or the setting a "hold" on an equal amount of funds in the payee's account.

After one or more electronic bills have been posted to the bill mailbox 226 for a given client, the client may review the bills. Assuming that the client agrees to payment of the requested amount specified in a particular bill, the client thereafter issues a credit transaction for transferring the appropriate amount of funds directly via the settlement system 200 to the corresponding bill issuer. The resulting credit transaction is handled by the settlement processor 224, as described below. However, in addition to normal credit transaction processing, the settlement processor 224 also instructs the bill processor 222 to clear the corresponding bill from the payor's mailbox once the credit transaction has been successfully performed. In this way bill transactions are handled by the same financial transaction infrastructure used for debit and credit transactions. As a result, bill transactions are handled reliably and efficiently from the perspective of financial institutions as well as from the perspective of the end users.

The settlement processor 224 performs several functions, which will be described next. The primary functions of the settlement processor 224 are to "clear and settle" transactions by updating special correspondent accounts it maintains for all the financial institutions it exchanges transactions with, and to forward transactions to either the financial transaction servers of other financial institutions or to the "on-us" port 240 of its own bank for transactions associated with its own client accounts. In addition, the settlement processor 224 forwards "return transaction" messages to and from its own bank and to other financial transaction servers whenever an electronic check is returned due to various reasons, such as insufficient funds in the payor's account.

Figure 4:
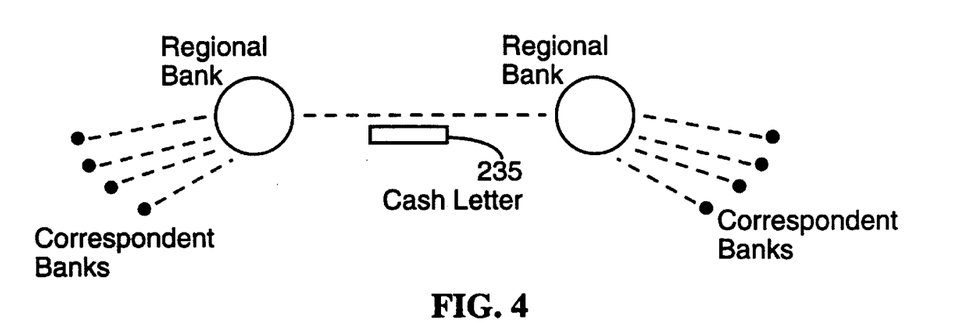
FIG. 4 schematically represents the transmission of a cash letter from one regional bank to another.

The settlement processor 224 receives electronic check and credit transaction from the front end processor 220. Electronic checks and credits are received by the settlement processor 224 from correspondent banks via the network interface 230 either individually, or in groups in the form of "cash letters." The settlement processor 224 also receives electronic checks and credits from other regional banks in the form of cash letters 235. See FIG. 4. Each cash letter is an encrypted electronic message that holds a set of electronic checks and credit transactions. When a regional bank receives a cash letter from another regional bank, all the electronic checks and credits in that cash letter will be associated with client accounts at either the receiving regional bank or at the receiving regional bank's correspondent banks. When a regional bank receives a cash letter from one of its correspondent banks, all the electronic checks and credits in that cash letter will be associated with client accounts at either the receiving regional bank or at other regional banks and their correspondent banks.

In one embodiment, the settlement processors 224 in the financial transaction servers transmit electronic checks and credits in a batch mode. In particular, each settlement processor 224 stores all electronic checks and credits that are to be forwarded to other financial institutions until either (A) enough transactions have been accumulated for a particular institution to exceed a predefined threshold, in which case the accumulated transactions for that institution are packaged in one or more cash letters and transmitted to the financial transaction server for the specified financial institution, or (B) a trigger time is reached, in which event the accumulated transactions for all institutions are packaged into separate cash letters and transmitted to the respective financial transaction servers for those institutions. In this embodiment, a uniform, once-a-day trigger time is used by all financial transaction servers, such as 10 a.m. Eastern Standard Time (EST). In another embodiment, there is a trigger time such as once per hour, causing all accumulated transactions to be packaged in cash letters and transmitted throughout each business day.

The settlement processor 224 works in conjunction with an accounting processor 232 to maintain a set of accounts 234, 238 with due-to and due-from balances with respect to each of its correspondent banks and each regional bank. In particular, the regional bank's accounting processor 232 maintains a distinct correspondent account for each correspondent bank using the settlement and clearing services of the regional bank. The accounting processor 232 also maintains a distinct account 238 for each regional bank to keep track of the net-balance total of the day of all transactions with respect to each regional bank. Each correspondent account 234 has a balance that represents the amount of funds held by the regional bank on behalf of the corresponding correspondent bank. As each electronic check and credit transaction is processed by the settlement processor 224, balancing credit and debits are posted to either the correspondent accounts 234 or the regional bank net-balance accounts 238 by the settlement processor 224 via the accounting processor 232, unless the target client account for the electronic check or credit is a client of the receiving bank.

Note that electronic checks are submitted to the settlement and clearance system by payees after they have digital signed the electronic check. Therefore, when the settlement processor 224 processes an electronic check issued by one of its own client accounts, it posts a credit to the correspondent account 234 for the payee's financial institution if the electronic check was received from a correspondent bank (i.e., if the payee's bank is a correspondent bank) or posts a credit to the net-balance account 238 for the regional bank servicing the payee's financial institution if the electronic check was received from a regional bank. Then the electronic check is forwarded by the settlement processor 224 to the "on-use" port 240 of the receiving bank so that the appropriate amount of funds will be deducted from the payor's account. The "on-us" port 240 of each bank couples the bank's internal transaction processing system (such as the check processing system and the demand on deposit account (DDA) system) with that of the financial transaction server 202, 204.

When the settlement processor 224 processes an electronic check issued to one of its own client accounts (which is generally an electronic check received via the front end processor 220), it posts a debit to the correspondent account 234 for the payor's financial institution if the electronic check was received from a correspondent bank (i.e., if the payor's bank is a correspondent bank) or posts the debit to the net-balance account 238 for the regional bank servicing the payor's financial institution if the electronic check was received from a regional bank. A copy of the electronic check is forwarded by the settlement processor 224 to the "on-us" port 240 of the receiving bank so that the appropriate amount of funds will be credited to the payee's account. In addition, the electronic check is added to the set of transactions that are to be sent to the payor's financial transaction server in a cash letter.

When the settlement processor 224 processes an electronic check issued by a client account of one of its correspondent banks and the payee is not a client of the receiving regional bank, the settlement processor posts a debit to the correspondent account 234 for the payor's financial institution and it posts a balancing credit to account for the payee's financial institution (i.e., credits the correspondent account 234 for a correspondent bank if the payee's account is at a correspondent bank serviced by this regional bank, or credits the net-balance account 238 for a regional bank if the payee's account is at another regional bank or at a correspondent bank serviced by another regional bank). In addition, after posting the balancing debit and credit, the electronic check is added to the set of transactions that are to be sent to the payor's financial transaction server in a cash letter. At one or more fixed times each day, these transactions are sent to the payor's financial transaction server via the network interface 230.

When the settlement processor 224 processes an electronic check issued to a client account of one of its correspondent banks and the payor is not a client of the receiving regional bank, the settlement processor posts a credit to the correspondent account for the payee's financial institution and it posts a balancing debit to correspondent account for the payor's financial institution (i.e., debits the correspondent account 234 for a correspondent bank if the payor's account is at a correspondent bank serviced by this regional bank, or debits the net-balance account 238 for a regional bank if the payor's account is at another regional bank or at a correspondent bank serviced by another regional bank). In addition, after posting the balancing debit and credit, the electronic check is added to the set of transactions that are to be sent to the payor's financial transaction server (i.e., to the financial transaction server for the correspondent bank that holds the payor's account) in a cash letter.

A "return transaction," which are generated whenever an electronic check is returned by the payor's financial institution due to insufficient funds in the payor's account or other reasons, is treated by the financial transaction servers of the present invention the same as an electronic check issued by the returned transaction's payee to the returned transaction's payor. In this way, the funds credited to the returned transaction's payee's financial institution are recaptured and the transaction is reversed. However, the financial institution for the payee, upon receiving a return transaction should, of course, notify the payee that the corresponding electronic check was returned for the reason specified by the payor's bank.

Credit transactions are handled by the settlement processor 224 in much the same way as electronic checks. When processing a credit transaction issued by one of its own client accounts, the settlement processor 224 credits the payee's financial institution (i.e., credits the correspondent account 234 for a correspondent bank if the payee's account is at a correspondent bank serviced by this regional bank, or credits the net-balance account 238 for a regional bank if the payee's account is at another regional bank or at a correspondent bank serviced by another regional bank). Then the credit transaction is added to the set of transactions that are to be sent to the payee's financial transaction server (i.e., to the financial transaction server for a correspondent bank if the payee's account is at a correspondent bank serviced by this regional bank, or to the financial transaction server for a regional bank if the payee's account is at another regional bank or at a correspondent bank serviced by another regional bank) in a cash letter.

When processing a credit transaction issued to one of its own client accounts, the settlement processor 224 debits the payor's financial institution (i.e., debits the correspondent account 234 for a correspondent bank if the payor's account is at a correspondent bank serviced by this regional bank, or debits the net-balance account 238 for a regional bank if the payor's account is at another regional bank or at a correspondent bank serviced by another regional bank). Then the credit transaction is forwarded by the settlement processor 224 to the "on-us" port 240 of this receiving bank so that the appropriate amount of funds will be credited to the payee's account.

When the settlement processor 224 processes a credit transaction issued by a client account of another bank and the payee is not a client of the receiving regional bank, the settlement processor posts a credit to the account 234 or 238 for the payee's financial institution (i.e., credits the correspondent account 234 for a correspondent bank if the payee's account is at a correspondent bank serviced by this regional bank, or credits the net-balance account 238 for a regional bank if the payee's account is at another regional bank or at a correspondent bank serviced by another regional bank), and it posts a balancing debit to correspondent account for the payor's financial institution (i.e., debits the correspondent account 234 for a correspondent bank if the payor's account is at a correspondent bank serviced by this regional bank, or debits the net-balance account 238 for a regional bank if the payor's account is at another regional bank or at a correspondent bank serviced by another regional bank). In addition, after posting the balancing debit and credit, the credit transaction is added to the set of transactions that are to be sent to the payee's financial transaction server (i.e., to the financial transaction server for a correspondent bank if the payee's account is at a correspondent bank serviced by this regional bank, or to the financial transaction server for a regional bank if the payee's account is at another regional bank or at a correspondent bank serviced by another regional bank) in a cash letter.

Clearly, the correspondent accounts 234 and the net-balance accounts 238 can have either positive or negative balances, depending on the debit and credit transactions that have been processed. In one preferred embodiment, negative balances are generally tolerated while transactions are being settled during each business day (unless, perhaps, the negative balance were to exceed an established maximum value). However, at the end of each business day, or other designated time period, balances in the accounts 238 for regional banks are settled through the use of a settlement institution or clearing house organization. In particular, at a specified time each business day, the settlement processor 224 of the regional bank's financial transaction server sends to the settlement institution, via settlement interface 242, an electronic funds transfer (EFT) request for each regional bank that has a positive balance, so as to send those funds to the other regional bank. When all the EFT requests from all the regional banks have been processed by the settlement institution, confirmation notices are sent to the settlement processors 224 via their respective settlement interfaces 242. The settlement processors 224 update the net-balance accounts 238 for each confirmed EFT, and as a result the net-balance accounts 238 for all regional banks should have a zero balance at the conclusion of this settlement process.

Financial Transaction Server for Correspondent Banks

Figure 5:
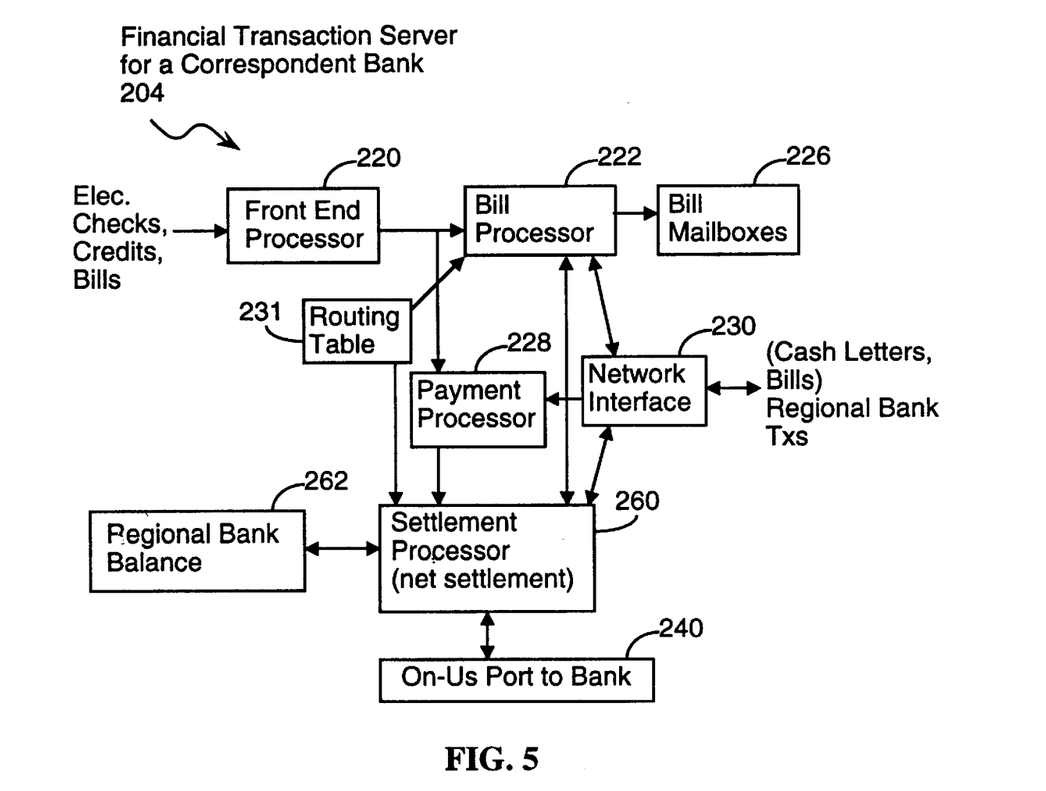
FIG. 5 is a block diagram of the software modules in a financial transaction server for a correspondent bank in accordance with an embodiment of the present invention.

Referring to FIG. 5, the financial transaction server 204 for correspondent banks is similar to that of the regional banks, except that this server 204 communicates with only one, fixed regional bank. It does not forward transactions from one server to another, and also it does not maintain correspondent accounts. More particularly, the functions of the front end processor 220, bill processor 222, bill mailboxes 226 and network interface 230 are the same for the financial transaction servers for both regional and correspondent banks, except that the network interface 230 communicates with only one, fixed regional bank. The settlement processor 260 for a correspondent bank, however, performs fewer functions than the settlement processor 224 for a regional bank. For each electronic check or credit transaction being processed, the settlement processor 260 posts either a credit or debit to a single regional bank balance account 262 that is used to keep track of the net balance of the correspondent bank's account at its regional bank.

All incoming electronic check and credit transactions received via the network interface are processed by the settlement processor 260 by posting a credit or debit to the regional bank balance 262, and then forwarding the transaction to the "on-us" port of the receiving correspondent bank, where the appropriate amount of funds will be debited or credited to the associated client account. In the event that an electronic check must be returned for various reasons such as insufficient funds, a return transaction is generated by the bank's internal transaction processor and sent to the settlement processor 260. The settlement processor then transmits the return transaction back to the other party to the transaction via the network interface 230. Return transactions are bundled with electronic checks and credit transactions in cash letters.

All incoming check and credit transactions received via the front end processor 220 are processed by the payment processor 228 and the settlement processor 260 by posting a credit or debit to the regional bank balance 262, forwarding a copy of the transaction to the "on-us" port of the receiving correspondent bank, where the appropriate amount of funds will be credited to or debited from the associated client account, and also forwarding the received transaction in a cash letter via the network interface 230 to the correspondent bank's regional bank.

When, at the end of a business day, a correspondent bank's balance with its regional bank service provider is below a first established threshold, as indicated by the value in the regional bank balance 262 maintained by the settlement processor 260, the correspondent bank may transfer funds to the regional bank using an established funds transfer mechanism previously agreed upon by the two banks, such as FedWire or ACH. Such fund transfers may be manually initiated by bank personnel. The funds transfer will bring the correspondent bank's balance up to or above the first established threshold. When the funds transfer confirmation notices are sent to the settlement processors 224 and 260 of the regional and correspondent banks, the respective correspondent account and regional bank balances will be updated in accordance with the confirmed EFT, and as a result the correspondent account for all correspondent bank will have a balance at or above the first established threshold.

Similarly, when, at the end of a business day, a correspondent bank's balance with its regional bank service provider is above a second established threshold, as indicated by the value in the regional bank balance 262 maintained by the settlement processor, the regional bank may choose to electronically transfer the excess funds to the correspondent bank through ACH of FedWire. The funds transfer will bring the correspondent bank's balance down to or below the second established threshold.

In one embodiment of the present invention, all accumulated electronic checks and credit transactions that have not yet been sent to their respective destinations are transmitted by all financial transaction servers to their respective destinations at a fixed time of day such as 10:00 a.m. EST. The regional bank financial transaction servers process all the resulting cash letters, forwarding transactions are required to their correspondent banks, and receive settlement confirmations and return transactions from the respective banks. Check and credit clearance confirmations are sent to all banks by 11:00 a.m EST. Net settlement electronic fund transfers for effecting net fund transfers between the participating banks are performed by 2:00 p.m. EST, thereby making the transferred funds available to the banks and their clients the same day that the electronic checks and credits were submitted for processing.

Figure 6A:
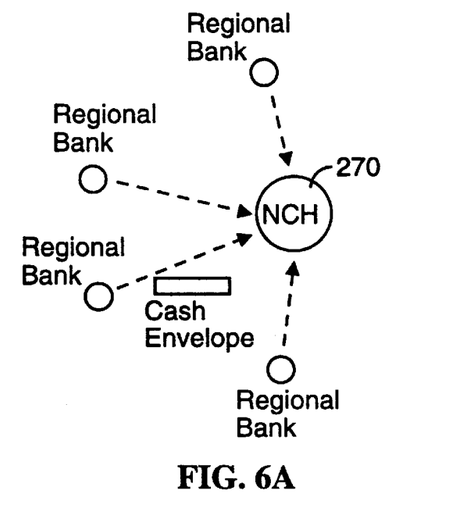
FIGS. 6A and 6B depict the transmission of cash letters between regional banks using a central cash letter clearance agent.
Figure 6B:
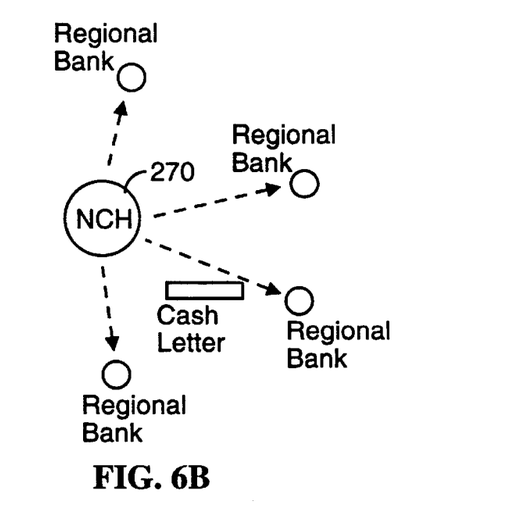

Referring to FIGS. 6A and 6B, in the event that the number of regional banks grows sufficiently large that the number of cash letters being transmitted between regional banks becomes excessive, cash letters can instead be routed through one centralized national clearing house (NCH) server. Each regional bank's financial transaction server bundles into a "cash envelope" all the cash letters it would otherwise send to individual regional banks and sends the cash envelope to the NCH server 270. The NCH server, which functions solely as a dispatching system without performing check clearing, collects all the cash envelopes from the regional bank financial transaction servers, sorts the cash letters in the envelopes based on the destination of the cash letters, and then forwards the cash letters to their respective destinations. By aggregating all the cash letters for each destination, the NCH server mechanism reduces the number of cash letter transmissions from approximately $(N-1)^2$, to $2N$, where N is the total number of regional bank financial transaction servers in operation in the clearing and settlement system 200.

While the present invention has been described with reference to a few specific embodiments, the description is illustrative of the invention and is not to be construed as to limiting the invention. Various modifications may occur to those skilled in the art without departing from the true spirit and scope of the invention as defined by the appended claims.

What is claimed:

1. An electronic financial transaction server, associated with a financial institution, comprising:
   a first interface for receiving electronic checking transactions, each electronic checking transaction specifying a payor, a payor's financial institution, a payee and a payee's financial institution;
   a second interface for transferring electronic checking transactions to and from other electronic financial transaction servers associated with other financial institutions;
   a third interface for transferring electronic checking transactions to and from other computer systems associated with said financial institution;
   transaction logic for determining, for each electronic checking transaction received via said first interface, whether said received electronic checking transaction satisfies predefined integrity criteria; and
   settlement logic for clearing and settling each received electronic checking transaction by updating at least one account balance associated with at least one of the payor's or payee's financial institutions, and forwarding said received electronic checking transaction to at least one of the payor's or payee's financial institutions via said second or third interface.

2. The electronic financial transaction server of claim 1, further comprising:
   a fourth interface for transferring electronic transactions to an automatic clearing house.

3. The electronic financial transaction server of claim 1, wherein:
   said settlement logic includes logic for accumulating electronic checking transactions to be forwarded to each other distinct electronic financial transaction server, said settlement logic aggregating the accumulated electronic checking transactions to be sent to said each other distinct electronic financial transaction server into distinct cash letters, and then transmitting the cash letters to said other distinct electronic financial transaction servers via said second interface.

4. The electronic financial transaction server of claim 1, wherein:
   said first interface is also adapted to receive electronic credit transactions and electronic billing transactions.

5. The electronic financial transaction server of claim 1, wherein:
   the payor's and payee's financial institutions specified by at least one of said electronic checking transactions are both the same as said financial institution associated with said electronic financial transaction server; and
   said settlement logic updates account balances associated with both the payor's and payee's financial institutions and forwards said electronic checking transaction to the payor's and payee's financial institutions via said third interface only.

6. The electronic financial transaction server of claim 1, wherein:
   the payor's financial institution specified by at least one of said electronic checking transactions comprises one of said other financial institutions;
   the payee's financial institution specified by said electronic checking transaction is the same as said financial institution associated with said electronic financial transaction server; and
   said settlement logic updates account balances associated with both the payor's and payee's financial institutions, forwards said electronic checking transaction to the payor's financial institution via said second interface, and forwards said electronic checking transaction to the payee's financial institution via said third interface.

7. The electronic financial transaction server of claim 1, wherein:
   the payor's financial institution specified by at least one of said electronic checking transactions is the same as said financial institution associated with said electronic financial transaction server;
   the payee's financial institution specified by said electronic checking transaction comprises one of said other financial institutions; and
   said settlement logic updates account balances associated with both the payor's and payee's financial institutions, forwards said electronic checking transaction to the payor's financial institution via said third interface, and forwards said electronic checking transaction to the payee's financial institution via said second interface.

8. A method of operating an electronic financial transaction server associated with a financial institution, comprising the steps of:
   receiving electronic checking transactions from clients, each electronic checking transaction specifying a payor, a payor's financial institution, a payee and a payee's financial institution;
   transferring electronic checking transactions to other electronic financial transaction servers associated with other financial institutions and receiving electronic checking transactions from said other electronic financial transaction servers;
   determining, for each electronic checking transaction received from said clients whether said received electronic checking transaction satisfies predefined integrity criteria; and
   clearing and settling each received electronic checking transaction by updating at least one account balance associated with at least one of the payor's or payee's financial institutions, and forwarding said received electronic checking transaction to at least one of the payor's or payee's financial institutions.

9. The method of claim 8, wherein:
   said processing step includes accumulating electronic checking transactions to be forwarded to each other distinct electronic financial transaction server, aggregating the accumulated electronic checking transactions to be sent to said each other distinct electronic financial transaction server into distinct cash letters, and then transmitting the cash letters to said other distinct electronic financial transaction servers via said second interface.

10. The method of claim 8, wherein:
    said receiving step further comprises receiving electronic credit transactions and electronic billing transactions.

11. The method of claim 8, wherein:
    said clearing and settling step includes updating account balances associated with both the payor's and payee's financial institutions and forwarding said electronic checking transaction to both the payor's and payee's financial institutions.

* * * * *